United States Patent
Lochner et al.

(10) Patent No.: US 12,044,471 B2
(45) Date of Patent: Jul. 23, 2024

(54) METHOD FOR OPERATING A HEAT EXCHANGER, ARRANGEMENT WITH A HEAT EXCHANGER, AND SYSTEM WITH A CORRESPONDING ARRANGEMENT

(71) Applicant: LINDE GMBH, Pullach (DE)

(72) Inventors: Stefan Lochner, Grafing (DE); Ralph Spöri, Egling (DE); Reinhold Hölzl, Geretsried (DE); Axel Lehmacher, Egling-Moosham (DE); Alexander Woitalka, Munich (DE); Sven Schauder, Pullach (DE)

(73) Assignee: Linde GmbH, Pullach (DE)

( * ) Notice: Subject to any disclaimer, the term of this patent is extended or adjusted under 35 U.S.C. 154(b) by 492 days.

(21) Appl. No.: 17/594,096

(22) PCT Filed: Mar. 27, 2020

(86) PCT No.: PCT/EP2020/025150
§ 371 (c)(1),
(2) Date: Oct. 1, 2021

(87) PCT Pub. No.: WO2020/200521
PCT Pub. Date: Oct. 8, 2020

(65) Prior Publication Data
US 2022/0252345 A1    Aug. 11, 2022

(30) Foreign Application Priority Data
Apr. 5, 2019 (EP) .................................... 19020257

(51) Int. Cl.
*F25J 3/04* (2006.01)
*F25J 1/00* (2006.01)
*F25J 1/02* (2006.01)

(52) U.S. Cl.
CPC ......... *F25J 3/04787* (2013.01); *F25J 1/0012* (2013.01); *F25J 1/0015* (2013.01);
(Continued)

(58) Field of Classification Search
CPC ...... F25J 3/04787; F25J 1/0012; F25J 1/0015; F25J 1/0037; F25J 1/004; F25J 1/0045;
(Continued)

(56) References Cited

U.S. PATENT DOCUMENTS

| | | | | |
|---|---|---|---|---|
| 3,086,371 A | * | 4/1963 | Schilling | F25J 3/04781 62/650 |
| 3,754,406 A | * | 8/1973 | Allam | F25J 3/04206 62/646 |

(Continued)

FOREIGN PATENT DOCUMENTS

| | | | | |
|---|---|---|---|---|
| CA | 2204149 A1 | * | 5/1996 | |
| CA | 2893197 C | * | 11/2020 | B01D 53/04 |

(Continued)

OTHER PUBLICATIONS

The Standards of the Brazed Aluminium Plate-Fin Heat Exchanger Manufacturers' Association, Second Edition, 2000, pp. 1-77. (Year: 2000) [online] [retrieved on Mar. 23, 2024].*

(Continued)

*Primary Examiner* — Ljiljana V. Ciric
(74) *Attorney, Agent, or Firm* — Millen, White, Zelano & Branigan, P.C.; Brion P. Heaney

(57) ABSTRACT

A method for operating a heat exchanger, in which a first operating mode is carried out in first time periods, and a second operating mode is carried out in second time periods that alternate with the first time periods; in the first operating mode a first fluid flow is formed at a first temperature, is fed into the heat exchanger in a first region at the first temperature, and is partially or completely cooled in the heat (Continued)

exchanger; in the first operating mode a second fluid flow is formed at a second temperature, is fed into the heat exchanger in a second region at the second temperature, and is partially or completely heated in the heat exchanger; and in the second operating mode the feeding of the first fluid flow and of the second fluid flow into the heat exchanger is partially or completely halted.

15 Claims, 4 Drawing Sheets

(52) U.S. Cl.
CPC .............. *F25J 1/0037* (2013.01); *F25J 1/004* (2013.01); *F25J 1/0045* (2013.01); *F25J 1/0202* (2013.01); *F25J 1/0248* (2013.01); *F25J 1/0251* (2013.01); *F25J 3/0409* (2013.01); *F25J 3/04296* (2013.01); *F25J 3/04412* (2013.01); *F25J 3/04721* (2013.01); *F25J 2270/06* (2013.01); *F25J 2280/20* (2013.01); *Y02E 60/14* (2013.01)

(58) Field of Classification Search
CPC ........ F25J 1/0202; F25J 1/0248; F25J 1/0251; F25J 3/0409; F25J 3/04296; F25J 3/04412; F25J 3/04721; F25J 2270/06; F25J 2280/20; Y02E 60/14
See application file for complete search history.

(56) References Cited

U.S. PATENT DOCUMENTS

| | | | | |
|---|---|---|---|---|
| 3,967,464 A * | 7/1976 | Cormier | ............... | F25J 3/04412 95/120 |
| 4,133,662 A * | 1/1979 | Wagner | ............... | F25J 3/0409 62/650 |
| 4,617,036 A * | 10/1986 | Suchdeo | ............... | F25J 3/04321 62/652 |
| 4,702,903 A * | 10/1987 | Keefer | ............... | B01D 53/047 252/373 |
| 5,123,249 A * | 6/1992 | Buttle | ............... | F25J 3/04678 62/646 |
| 5,165,244 A * | 11/1992 | Kleinberg | ............... | F25J 3/0423 62/651 |
| 5,233,839 A | 8/1993 | Greter et al. | | |
| 5,615,561 A * | 4/1997 | Houshmand | ........... | F25J 3/0238 62/611 |
| 5,661,987 A * | 9/1997 | Zarate | ............... | F25J 3/04181 95/115 |
| 6,131,407 A * | 10/2000 | Wissolik | ............... | F25J 3/04224 62/913 |
| 6,321,566 B1 * | 11/2001 | Yamamoto | ............. | F25J 3/0409 62/643 |
| 7,100,399 B2 * | 9/2006 | Eaton | ............... | F25J 1/0247 62/623 |
| 10,981,103 B2 * | 4/2021 | Parsnick | ............. | F25J 3/04812 |
| 11,054,182 B2 * | 7/2021 | Zhao | ............. | F25J 3/04709 |
| 2009/0277220 A1 * | 11/2009 | Howard | ............. | F25J 3/04424 62/643 |
| 2010/0037656 A1 * | 2/2010 | Prosser | ............. | F25J 3/04054 62/643 |
| 2016/0025408 A1 * | 1/2016 | Xu | ............. | F25J 3/0409 62/643 |
| 2017/0030638 A1 * | 2/2017 | Prosser | ............. | F25J 3/04412 |
| 2017/0030640 A1 * | 2/2017 | Du | ............. | F25J 3/04969 |
| 2018/0073804 A1 * | 3/2018 | Allam | ............. | F25J 3/04181 |
| 2022/0252345 A1 * | 8/2022 | Lochner | ............. | F25J 1/0037 |
| 2022/0316811 A1 * | 10/2022 | Lochner | ............. | F25J 3/04187 |
| 2023/0221069 A1 * | 7/2023 | Kromer | ............. | F25J 3/0409 62/650 |

FOREIGN PATENT DOCUMENTS

| | | | | |
|---|---|---|---|---|
| DE | 4207941 A1 * | 9/1992 | | |
| DE | 4207941 A1 | 9/1992 | | |
| DE | 102011003391 A1 | 8/2012 | | |
| EP | 3032203 A1 | 6/2016 | | |
| EP | 3557165 A1 * | 10/2019 | ........... | F25J 3/04084 |
| FR | 3118145 A1 * | 6/2022 | ............... | F25J 3/044 |
| KR | 20030046252 A | 6/2003 | | |
| NO | 307231 B1 * | 2/2000 | ............. | F25J 1/0022 |
| WO | WO-2019201475 A1 * | 10/2019 | ........... | F25J 3/04084 |
| WO | WO-2022115721 A2 * | 6/2022 | ............. | B01D 53/62 |

OTHER PUBLICATIONS

H.W. Haring, "Industrial Gases Processing", Wiley-VCH, Oct. 26, 2007, pp. 24-67. (Year: 2007) [online] [retrieved on Mar. 23, 2024].*

H.-W. Häring (ed.), "Industrial Gases Processing", Wiley-VCH, 2006, in particular section 2.2.5.6, "Apparatus," 2007.

"The Standards of the Brazed Aluminium Plate-Fin Heat Exchanger Manufacturers' Association," 2nd edition, 2000, in particular section 1.2.1, "Components of an Exchanger."

H.-W. Häring (ed.), "Industrial Gases Processing", Wiley-VCH, 2006, in particular section 2.2.5, "Cryogenic Rectification," 2007.

* cited by examiner

METHOD FOR OPERATING A HEAT EXCHANGER, ARRANGEMENT WITH A HEAT EXCHANGER, AND SYSTEM WITH A CORRESPONDING ARRANGEMENT

The invention relates to a method for operating a heat exchanger, to an arrangement having a correspondingly operable heat exchanger, and to a system having a corresponding arrangement according to the preambles of the respective independent claims.

PRIOR ART

In many fields of application, heat exchangers (more technically correct: heat transfer devices) are operated with cryogenic fluids, i.e., fluids at temperatures significantly below 0° C., in particular significantly below −100° C. The present invention is predominantly described below with reference to the main heat exchangers of air separation systems but is in principle also suitable for use in other fields of application, for example for systems for storing and recovering energy using liquid air or for natural gas liquefaction or systems in petrochemistry.

For the reasons explained below, the present invention is also particularly suitable in systems for liquefying gaseous air products, for example gaseous nitrogen. Corresponding systems can, in particular, be supplied with gaseous nitrogen from air separation systems and liquefy it. In this case, liquefaction is not followed by rectification, as in an air separation system. Therefore, when the problems explained below are overcome, these systems can be completely switched off, for example when there is no demand for corresponding liquefaction products, and kept in standby until the next use.

For the construction and operation of main heat exchangers of air separation systems and other heat exchangers, reference is made to relevant technical literature, for example H.-W. Häring (ed.), Industrial Gases Processing, Wiley-VCH, 2006, in particular section 2.2.5.6, "Apparatus." Details on heat exchangers in general can be found, for example, in the publication "The Standards of the Brazed Aluminium Plate-Fin Heat Exchanger Manufacturers' Association," 2nd edition, 2000, in particular section 1.2.1, "Components of an Exchanger."

Without additional measures, heat exchangers of air separation systems and other heat exchangers through which warm and cryogenic media flow perform temperature equalization and heat up when the associated system is at a standstill and the heat exchanger is thus taken out of operation, or the temperature profile forming in a corresponding heat exchanger during steady-state operation cannot be maintained in such a case. If, for example, cryogenic gas is subsequently fed into a heated heat exchanger or vice versa when it is put back into operation, high thermal stresses occur as a result of different thermal expansion due to differential temperature differences, which can lead to damage to the heat exchanger or require a disproportionately high outlay on material or manufacturing in order to avoid such damage.

In particular, when a heat exchanger is taken out of operation before it has completely heated up, the temperatures at the previously warm end and at the previously cold end equalize due to the good thermal conduction (thermal longitudinal conduction) in its metallic material. In other words, the previously warm end of the heat exchanger becomes colder over time and the previously cold end of the heat exchanger becomes warmer until said temperatures are at or close to an average temperature. This is also illustrated again in the attached FIG. 1. The temperatures, which were here at approximately −175° C. and +20° C., respectively, at the time of taking out of operation, become equal to each other over several hours and almost reach a mean temperature.

This behavior is observed in particular when the main heat exchanger, which is accommodated in a cold-insulated manner, is blocked in together with the rectification unit, i.e., when no more gas is supplied from the outside, when an air separation system is switched off. In such a case, typically, only gas produced by thermal insulation losses is blown off cold. The same also applies if a system for liquefying a gaseous air product, for example liquid nitrogen, is switched off.

If warm fluid is subsequently fed in at the cooled warm end of the heat exchanger when it is put back into operation, the temperature rises abruptly there. The temperature at the heated cold end correspondingly decreases abruptly if corresponding cold fluid is fed in there when the heat exchanger is put back into operation. This leads to the aforementioned material stresses and thus, possibly, to damage.

DE 42 07 941 A1 discloses a method for operating a heat exchanger in a discontinuously operating system for treating fluids, in which, during the operating times interrupted by standstill times, at least one refrigerant flows in first channels of the heat exchanger from its cold end to its warm end and at least one heat-releasing fluid or fluid to be cooled flows in second channels of the heat exchanger from its warm end to its cold end. During the standstill times, heat is supplied to the warm end and cold is supplied to the cold end so that these two ends are maintained at temperatures that are relatively close to the corresponding temperatures during the operating times, and at least the supplied cold or the supplied heat is delivered by a fluid present in the system.

The object of the present invention is to specify further improved measures which allow a corresponding heat exchanger, in particular in one of the aforementioned systems, to be put back into operation after being out of operation for a relatively long time, without the aforementioned disadvantageous effects occurring.

DISCLOSURE OF THE INVENTION

Against this background, the present invention proposes a method for operating a heat exchanger, an arrangement having a correspondingly operable heat exchanger, and a system having a corresponding arrangement having the features of the respective independent claims.

First, some terms used to describe the present invention are explained and defined below.

In the terminology used herein, a "heat exchanger" is an apparatus which is designed for indirectly transferring heat between at least two fluid flows, for example guided in counter-flow relative to one another. A heat exchanger for use within the scope of the present invention can be formed from one or more heat exchanger sections connected in parallel and/or in series, e.g., from one or more plate heat exchanger blocks. However, the invention is in principle also suitable for other types of heat exchangers and is not limited to plate heat exchangers. A heat exchanger has "passages" which are configured to conduct fluid and are separated from other passages by separating plates or connected on the inlet and outlet sides only via the respective headers. The passages are separated from the outside by means of side bars. Said passages are referred to below as "heat exchanger passages." Following the customary terminology, the two terms "heat exchanger" and "heat transfer device" are used synonymously below. The same also applies to the terms "heat exchange" and "heat transfer."

The present invention relates in particular to the apparatuses referred to as plate-fin heat exchangers according to ISO 15547-2:2005. If a "heat exchanger" is referred to below, this is therefore to be understood as meaning in particular a plate-fin heat exchanger. A plate-fin heat exchanger has a plurality of flat chambers or elongate channels lying one above the other, which are separated from one another in each case by corrugated or otherwise structured and interconnected, for example soldered, plates, generally made of aluminum. The plates are stabilized by means of side bars and connected to one another via said side bars. The structuring of the heat exchanger plates is used in particular to increase the heat exchange surface but also to increase the stability of the heat exchanger. The invention relates in particular to soldered plate-fin heat exchangers made of aluminum. In principle, however, corresponding heat exchangers can also be produced from other materials, for example stainless steel, or from various different materials.

As mentioned, the present invention can be used in air separation systems of the known type but also, for example, in systems for storing and recovering energy using liquid air. The storage and recovery of energy using liquid air is also referred to as Liquid Air Energy Storage (LAES). A corresponding system is disclosed, for example, in EP 3 032 203 A1. Systems for liquefying nitrogen or other gaseous air products are likewise known from the technical literature. In principle, the present invention can also be used in any further systems in which a heat exchanger can be operated accordingly. For example, these can be systems for natural gas liquefaction and separation of natural gas, the aforementioned LAES systems, systems for air separation, liquefaction circuits of all types (in particular for air and nitrogen) with and without air separation, ethylene systems (i.e., in particular, separating systems which are configured to process gas mixtures from steam crackers), systems in which cooling circuits, for example with ethane or ethylene, are used at different pressure levels, and systems in which carbon monoxide circuits and/or carbon dioxide circuits are provided.

In LAES systems, in a first operating mode at times of high power supply, air is compressed, cooled, liquefied, and stored in an insulated tank system, with a corresponding power consumption. In a second operating mode at times of low power supply, the liquefied air stored in the tank system is heated, in particular after an increase in pressure by means of a pump, and is thus converted into the gaseous or supercritical state. A pressure flow obtained thereby is expanded in an expansion turbine, which is coupled to a generator. The electrical energy obtained in the generator is fed back into an electrical grid, for example.

In principle, corresponding storage and recovery of energy is possible not only using liquid air. Rather, other cryogenic liquids formed using air can also be stored in the first operating mode and used to generate electrical energy in the second operating mode. Examples of corresponding cryogenic liquids are liquid nitrogen or liquid oxygen or component mixtures consisting predominantly of liquid nitrogen or liquid oxygen. External heat and fuel can also be coupled into corresponding systems in order to increase efficiency and output power, in particular using a gas turbine, the exhaust gas of which is expanded together with the pressure flow formed from the air product in the second operating mode. The invention is also suitable for such systems.

Traditional air separation systems can be used to provide corresponding cryogenic liquids. If liquid air is used, it is also possible to use pure air liquefaction systems. The term "air treatment systems" is therefore also used below as an umbrella term for air separation systems and air liquefaction systems. The invention can also be used in particular in known nitrogen liquefiers.

ADVANTAGES OF THE INVENTION

In principle, while the associated system is at a standstill, cold gas from a tank or exhaust gas from the stopped system can flow through a heat exchanger in order to avoid heating or to maintain the temperature profile formed during steady-state operation (i.e., in particular the usual production operation of a corresponding system). However, such operation may be complex to realize using conventional methods.

In certain cases, as also proposed, for example, in U.S. Pat. No. 5,233,839 A (see also DE 42 07 941 A1 mentioned at the outset), in order to avoid cooling the warm end of a corresponding heat exchanger, heat can also be introduced there from the environment via heat bridges. If there is no process unit with significant buffer capacity for cold (e.g., no rectification column system with accumulation of cryogenic liquids) downstream of the heat exchanger, such as in a pure air liquefaction system, such temperature maintenance can thus reduce the occurrence of excessive thermal stresses when warm process flows are abruptly supplied at the warm end when the heat exchanger is put back into operation. In this case, the supplied warm process flows can, for example, be at least partially expanded by means of a turbine after exiting at the cold end of the heat exchanger and be returned to the warm end via the cold end as cold flows (which, however, in this case do not yet have the low temperature as is present at the cold end in normal operation). In this way, the heat exchanger can be slowly brought into its normal temperature profile by Joule-Thomson cooling. The present invention can also be used in this case, i.e., in processes in which, after restarting, the cold end of the heat exchanger is not directly charged with cold process flows (at the final temperature present in normal operation).

If, however, there is a process unit having a considerable buffer capacity for cold (e.g., a rectification column system with accumulation of cryogenic liquids, as in an air separation system) downstream of the heat exchanger, as is likewise possible within the scope of the present invention, it is possible, by means of the measures described above, to minimize the occurrence of thermal stresses at the warm end, but thermal stresses resulting from impermissibly high (temporal and local) temperature gradients can occur at the simultaneously warmed cold end owing to the abrupt starting of through-flow with colder fluid. In this case, the maintenance of the temperature of the warm end even promotes the formation of higher temperature differences at the cold end and thus promotes the occurrence of increased thermal stresses.

The present invention thus relates to both cases explained above. In other words, within the scope of the present invention (in addition to the always provided heating at the warm end of the heat exchanger), the cold end of the heat exchanger can be operated uncooled during standstill phases; however, corresponding cooling may also take place.

Against this background, the present invention proposes a method for operating a heat exchanger. As also explained in detail below, the heat exchanger can in particular be part of a corresponding arrangement, which in turn can be designed as part of a larger system. The present invention can be used in particular in air treatment systems of the type described in detail above and below. In principle, however, use in other fields of application is also possible, in which a flow through a corresponding heat exchanger is prevented during certain times, and the heat exchanger heats up during these times, or a temperature profile formed in the heat exchanger equalizes. In particular, the present invention can be used in an air separation system and less in a pure liquefier since a corresponding buffer capacity is present at the cold end in the former and it is therefore required or at least advantageous to keep the cold end cold during standstill phases.

The present invention relates in particular to such measures that avoid excessive thermal loading of the warm end of a heat exchanger. Within the scope of the present invention, however, such measures can, as already mentioned, be combined at any time with further measures aimed at reducing thermal stresses at the cold end of the heat exchanger. The measures proposed according to the invention and corresponding embodiments can thus be combined, in particular also in combination with a fluidic or non-fluidic cooling of the cold end of the heat exchanger, for example with a targeted flow through the cold part of the heat exchanger or its cold end using corresponding cold gas flows. For example, the present invention can be combined with measures such as are disclosed in U.S. Pat. No. 5,233,839 A already mentioned above. However, this is not mandatory. In all cases, both the maintenance of the temperature of the warm end of the heat exchanger proposed according to the invention and any cooling provided can take place at the heat exchanger using corresponding control and/or regulation strategies on the basis of one or more measured temperatures. In one embodiment, the present invention can in particular provide that, during a standstill phase of the system of which the discussed heat exchanger is part, evaporating gas from one or more storage containers of the system can, for example, flow through a cold end of the heat exchanger or the heat exchanger as a whole, as likewise already described in principle in the mentioned U.S. Pat. No. 5,233,839 A.

Such temperature control during corresponding standstill phases with boil-off gas enables practical utilization of cold gases, which would otherwise be blown off to the environment, and thus the at least partial utilization or recovery of the energy invested in their production. In a corresponding embodiment of the present invention, gas is thus conducted through the heat exchanger for temperature control instead of, as is typically the case in current methods, blowing off corresponding boil-off gas to the environment and in this way preventing excessive pressures and possibly a triggering of safety valves in a corresponding system. A corresponding method is thus in particular suitable for systems for obtaining cryogenic air products or for liquefying air gases since corresponding cryogenic air products or liquefied air gases are typically stored in storage containers in which corresponding evaporation occurs. However, such evaporation also occurs in rectification columns which are part of air separation systems and which therefore likewise have to be correspondingly "vented" in order to avoid excessively high pressures in these apparatuses.

The present invention proposes to carry out the method in a first operating mode in first time periods and in a second operating mode in second time periods that alternate with the first time periods. The first time periods and the second time periods do not overlap each other within the scope of the present invention. Within the scope of the present invention, the first time periods or the first operating mode carried out in this first time period corresponds to the production operation of a corresponding system, i.e., in the case of an air-gas liquefaction system, the operating time period in which a liquefaction product is provided, or in the case of an air separation system, the operating mode in which liquid and/or gaseous air products are provided by air separation. Accordingly, the second operating mode performed in the second operating time periods is an operating mode in which corresponding products are not formed. Corresponding second time periods or a second operating mode are used in particular for saving energy, for example in systems for liquefaction and re-evaporation of air products for energy generation or in the aforementioned LAES systems.

As already mentioned, in the second operating mode, flow preferably does not pass through the heat exchanger or passes through it to a significantly lesser extent than in the first operating mode. As already mentioned, the present invention does not exclude that certain quantities of gases are also conducted through a corresponding heat exchanger in the second operating mode, for example in order to maintain it at or bring it to temperature in support of the measures proposed according to the invention. However, the quantity of fluids conducted through the heat exchanger in the second operating mode is always significantly below the quantities of fluids conducted through the heat exchanger in a regular first operating mode. Within the scope of the present invention, the quantity of the fluids conducted through the heat exchanger in the second operating mode is, for example, not more than 20%, 10%, 5%, or 1% in total relative to the quantity of fluid conducted through the heat exchanger in the first operating mode.

Within the scope of the present invention, the first operating mode and the second operating mode are carried out alternately in the respective time periods, as mentioned, i.e., a respective first time period in which the first operating mode is carried out is always followed by a second time period in which the second operating mode is carried out, and the second time period and the second operating mode is then followed again by a first time period with the first operating mode, etc. However, this does not exclude, in particular, that further time periods with further operating modes can be provided between the respective first and second time periods, in particular a third time period with a third operating mode, optionally provided according to the invention. Within the scope of the present invention, in particular the following sequence results in the case of a third operating mode: first operating mode—second operating mode—third operating mode—first operating mode, etc.

Within the scope of the present invention, in the first operating mode, a first fluid flow is formed at a first temperature level, is fed into the heat exchanger in a first region at the first temperature level, and is partially or completely cooled in the heat exchanger. In particular, a gas or gas mixture to be liquefied or a gas mixture to be separated by a gas mixture separation method, which has been suitably processed and conditioned, for example purified and compressed, upstream can be used as a corresponding first fluid flow. Reference is made at this point to the usual operation of air separation systems. A corresponding gas mixture separation method always has an integrated gas liquefaction method, i.e., a gas is liquefied before it is separated.

Furthermore, in the first operating mode, a second fluid flow is formed at a second temperature level, is fed into the heat exchanger in a second region at the second temperature level, and is partially or completely heated in the heat exchanger. The formation of the second fluid flow can in particular be an extraction from a rectification column system of an air separation system and/or the formation of a return flow in a gas liquefaction system. In gas liquefaction systems, in order to cool the gas to be liquefied, a portion of the gas cooled under pressure and optionally already liquefied is expanded, in particular via expansion turbines, thereby cooled further, and used as a corresponding return flow. In other words, in order to cool the gas to be liquefied, a portion of the gas cooled under pressure can be expanded, performing work, thereby cooled, and used as refrigerant in a heat exchanger.

A second portion of the gas cooled under pressure, which was not correspondingly expanded, is liquefied in the heat exchanger due to the prevailing difference in pressure and quantity. This is also explained again with reference to FIG. 4 below.

The second temperature level corresponds in particular to the extraction temperature from a corresponding rectification column system or to the temperature at which a corresponding return flow is formed in a liquefaction system. It is preferably at cryogenic temperatures, in particular −50° C. to −200° C., for example −100° C. to −200° C. or −150° C. to −200° C. On the other hand, the first temperature level at which the first fluid flow is formed and supplied to the heat exchanger in the first region is preferably at the bypass temperature but in any case typically at a temperature level significantly above 0° C., for example from 10° C. to 50° C.

If it is mentioned here that a first or second fluid flow is formed at the first or second temperature level, this of course does not exclude that further fluid flows are formed at the first or second temperature level. Corresponding further fluid flows may have a composition identical to or different than the fluid of the first or second fluid flow. For example, a fluid in the form of a total flow can be extracted from a rectification column system, from which total flow a second fluid flow is formed by branching off the same. Furthermore, within the scope of the present invention, a plurality of fluid flows can optionally also be extracted from the rectification column system or correspondingly formed and subsequently combined with one another and used in this way to form the second fluid flow. Cryogenic liquid can also be fed externally from tanks to the rectification column system to keep it cold. Corresponding liquid can be evaporated in the rectification column system and conducted to the main heat exchanger and optionally to other apparatuses to be cooled. Both a cryogenic liquid formed in the gas mixture separation method and an externally provided cryogenic liquid can thus be evaporated, and an evaporated portion of the liquid can be at least partially used to cool the second region.

If it is mentioned here that a fluid flow in the heat exchanger is cooled or heated "partially or completely," it is to be understood that either the entire fluid flow is guided through the heat exchanger, either from a warm end or an intermediate temperature level to the cold end or an intermediate temperature level or vice versa, or that the corresponding fluid flow is divided in the heat exchanger into two or more subflows which are extracted from the heat exchanger at the same or different temperature levels. Of course, it is also possible to feed a further fluid flow to the respective fluid flow in the heat exchanger and to further cool or heat a combined flow formed in this way in the heat exchanger. In any case, however, a corresponding fluid flow is fed into the heat exchanger, at the first or second temperature level, and is cooled or heated in the heat exchanger (alone or together with further flows as explained above).

It is also self-evident that, in addition to the first and second fluid flows, further fluid flows can also be cooled or heated in the heat exchanger, to the same or different temperature levels and/or starting from the same or different temperature levels as the first or second fluid flow. Corresponding measures are customary and known in the field of air separation and reference can therefore be made in this regard to relevant technical literature, as was cited at the outset.

Within the scope of the present invention, in the second operating mode, the feeding of the first fluid flow and of the second fluid flow into the heat exchanger and the respective cooling and heating in the heat exchanger is partially or completely halted. For example, it is possible for no fluid to be conducted through the heat exchanger instead of the first fluid flow, which is conducted through the heat exchanger and cooled in the heat exchanger in the first operating mode. The heat exchanger passages of the heat exchanger used in the first operating mode to cool the first fluid flow thus remain without flow in this case. However, instead of the first fluid flow, which is conducted through the heat exchanger and cooled in the first operating mode, it is also possible to conduct a different fluid flow through the heat exchanger, in particular in a significantly smaller quantity. The same also applies to the second fluid flow, which can in particular be replaced by boil-off gas in the second operating mode, as mentioned.

Within the scope of the invention, it is provided that, in the second time period or in a third time period which lies between at least one of the second time periods and the subsequent first time period, heat provided by means of a heating device is supplied to the first region, wherein this heat is transferred according to the invention to the first region via a gas chamber which is located outside the heat exchanger and within which the first region is arranged or which surrounds the first region. Heat transfer takes place predominantly or exclusively without solid contact, i.e., predominantly or exclusively in the form of a heat transfer in the gas chamber, i.e., without or predominantly without heat transfer by solid-state thermal conduction. The term "predominantly" refers here to a proportion of the amount of heat of less than 20% or less than 10%.

The present invention thus provides for the warm end of a corresponding heat exchanger to be actively heated in the second time period or in a separate further time period. The term "outside the heat exchanger" delimits the present invention from an alternatively also possible heating by means of a targeted fluid flow through the heat exchanger passages. Heating thus does not take place by transferring heat from a fluid conducted through the heat exchanger passages.

In this connection, it should be pointed out in particular that when a "region" of a heat exchanger (the first region or the second region) is referred to here, such regions do not have to be limited to the direct feed point of the first or second fluid flow into the heat exchanger, but rather that these regions can also in particular be terminal sections of a corresponding heat exchanger, which can extend for a predetermined distance in the direction of the center of the heat exchanger. Corresponding regions can comprise in particular the terminal 10%, 20%, or 30% of a corresponding heat exchanger. Typically, corresponding regions are not structurally delineated in a defined manner from the rest of the heat exchanger.

In this case, the present invention has the particular advantage that, in contrast to the aforementioned U.S. Pat. No. 5,233,839 A, for example, no suspension of a corresponding region is required which is provided there for the transfer of heat. The present invention thus allows temperature control even in cases in which a heat exchanger block is mounted in other regions, for example at the bottom or in the center, in order to in this way reduce the stresses on the lines connecting a corresponding heat exchanger to the environment. On the other hand, the method presented in the prior art can only be used if a corresponding heat exchanger block is suspended at the top. A further disadvantage of the method described in the aforementioned prior art is that heat is introduced there only to a limited extent at the bearings and not over the entire surface of a heat exchanger in a corresponding region. This can result, for example, in icing at the sheet metal jacket transitions of a corresponding heat exchanger. In contrast, the present invention enables an advantageous introduction of heat and in this way effective temperature control without the disadvantages described above.

In particular, it can be provided within the scope of the present invention to transfer the heat to the first region at least partially by convection and/or radiation via the gas chamber. For convective heat transfer, gas turbulence can in particular be induced so that heat buildup can be avoided. On the other hand, heating solely by radiation may act directly on the the first region of the first heat exchanger via the corresponding infrared radiation.

Within the scope of the present invention, the second region of the heat exchanger can be operated without active heat dissipation and thus without being cooled, while heat is supplied to the first region in the second time period or in the third time period. In this case, the term "active heat dissipation" is intended to mean an intentionally induced heat emission to the surroundings, for example, by applying a fluid to the second region, i.e., bringing it into contact with or allowing it to flow through the second region, said fluid being at a lower temperature than the second region at the respective time of fluid application. Heat dissipation can nevertheless also take place here, for example by heat flowing out to colder regions. In this embodiment of the invention, however, no fluid through-flow effecting a cooling of the second region takes place.

Within the context of this embodiment of the present invention, heating of the second region is permitted, in particular, while heat is simultaneously supplied to the first region in the second time period or in the third time period. The permitted heating may in particular be more than 10 K, more than 20 K, more than 30 K, more than 40 K, or more than 50 K. With a corresponding duration, it can also take place in particular to a temperature to which the first end is heated by the supply of heat in the second time period or in the third time period. The heating of the second region can in particular also take place at least partially by the active heating of the first region and inflow of heat-by-heat conduction.

The embodiment of the present invention without active cooling is based on the finding that such cooling is not necessary in certain cases. By dispensing with the aforementioned measures, the operation of the heat exchanger therefore offers advantages because both the consumption of cold fluids is reduced thereby and corresponding hardware and control and regulation technology do not have to be provided in a complex manner.

In contrast to a temperature control of the warm and cold ends, the warm end of the heat exchanger can be kept warm more easily and cost-effectively without cooling at the cold end. In particular, it is not provided that, during a standstill phase of the system of which the discussed heat exchanger is part, evaporating gas from one or more storage containers of the system flows through a cold end of the heat exchanger or the heat exchanger as a whole, as described in the aforementioned U.S. Pat. No. 5,233,839 A.

The method according to the embodiment explained last is suitable, in particular, for use in the context of a gas liquefaction method, for example in the context of a method for liquefying nitrogen, air, or natural gas, in which a correspondingly liquefied gas mixture is not supplied to any separation process. In other words, it is provided in the gas liquefaction method to at least partially liquefy the first fluid flow and provide it in a non-separated state, i.e., in a substantially unchanged material composition, as a method product. Certain changes, which are however minor in comparison with separation, may result from the liquefaction itself due to the different condensation temperatures.

However, as also explained, the second region can be at least temporarily cooled, while heat is supplied in the first region in the second time period or in the third time period. A corresponding method according to this embodiment is in particular suitable for use in the context of a gas mixture separation method, in particular an air separation method, because a cryogenic rectification column system is provided here in which correspondingly cold fluids are stored. These are typically supplied cold to the second region of the heat exchanger. A corresponding cooling can prevent the cold end from being subjected to cold fluid, which causes thermal stresses, when the heat exchanger is put into operation again. In the gas mixture separation method, corresponding boil-off gas can in particular be used for cooling, i.e., liquid formed can be evaporated, and an evaporated portion of the liquid can be at least partially used to cool the second region.

The present invention extends to an arrangement with a heat exchanger, wherein the arrangement has means which are configured to carry out a first operating mode in first time periods and to carry out a second operating mode in second time periods that alternate with the first time periods, in the first operating mode to form a first fluid flow at a first temperature level, to feed it into the heat exchanger in a first region at the first temperature level, and to partially or completely cool it in the heat exchanger, furthermore in the first operating mode to form a second fluid flow at a second temperature level, to feed it into the heat exchanger in a second region at the second temperature level, and to partially or completely heat it in the heat exchanger, and in the second operating mode to partially or completely halt the feeding of the first fluid flow and of the second fluid flow into the heat exchanger.

A heating device is provided which is part of the arrangement and is configured to supply heat to the first region either in the second time period or in a third time period which lies between at least one of the second time periods and the subsequent first time period, the heat being provided by means of a heating device and being transferred according to the invention to the first region via a gas chamber which is located outside the heat exchanger, is likewise part of the arrangement, and in which the first region is arranged or which surrounds the first region.

For further aspects of such an arrangement, reference is expressly made to the above explanations regarding the method according to the invention and its embodiments. The arrangement according to the invention benefits from the advantages described for corresponding methods and method variants.

Within the scope of the present invention, the heat exchanger is advantageously arranged in a cold box which is also part of the arrangement, wherein the gas chamber is formed by a region free of insulating material within the cold box. The first region of the heat exchanger is arranged within the cold box in the gas chamber in particular without suspensions contacting the first region. For the advantage in this respect, reference is also made to the above explanations.

Within the scope of the present invention, the heating device can be designed as a radiant heater which can be heated, for example, electrically or using heating gas.

The present invention furthermore extends to a system which is characterized in that here has an arrangement as explained above. The system can be designed in particular as a gas liquefaction system or a gas mixture separation system. It is furthermore characterized in particular in that it is configured to carry out a method as previously explained in embodiments. As explained, a gas liquefaction process is typically provided in a typical gas mixture separation system, and the liquefied gas is subsequently separated.

The invention is described in more detail hereafter with reference to the accompanying drawings, which show an embodiment of the invention and corresponding heat exchange diagrams.

In the figures, elements which are identical or correspond to one another in function or meaning are indicated by identical reference signs and for the sake of clarity are not explained repeatedly.

DETAILED DESCRIPTION OF THE DRAWINGS

Figure 1:
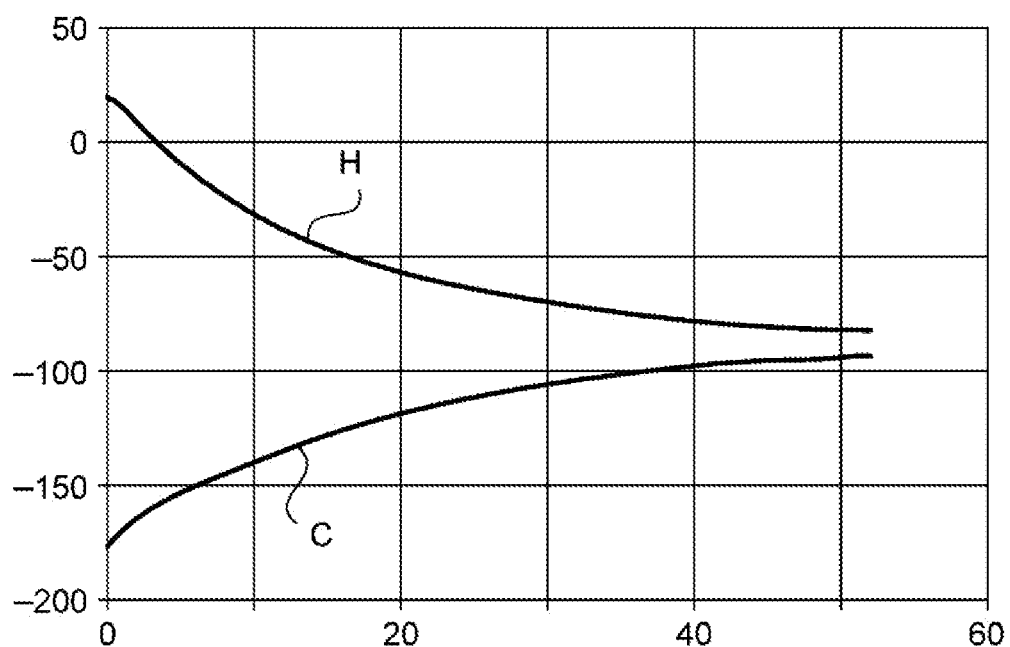
FIG. 1 illustrates temperature profiles in a heat exchanger after it has been taken out of operation without the use of measures according to an embodiment of the present invention.

FIG. 1 illustrates temperature profiles in a heat exchanger after it has been taken out of operation (when flow does not pass through the heat exchanger) without the use of measures according to advantageous embodiments of the present invention, in the form of a temperature diagram.

In the diagram shown in FIG. 1, a temperature at the warm end of a corresponding heat exchanger, denoted by H, and a temperature at the cold end, denoted by C, are each shown in ° C. on the ordinate over a time in hours on the abscissa.

As can be seen from FIG. 1, at the beginning of the shutdown, the temperature H at the warm end of the heat exchanger, which still corresponds to the temperature in a regular operation of the heat exchanger, is approximately 20° C., and the temperature C at the cold end is approximately −175° C. These temperatures become more equal to each other over time. The high thermal conductivity of the materials installed in the heat exchanger is responsible for this. In other words, heat flows from the warm end toward the cold end here. Together with the heat input from the environment, a mean temperature of approx. −90° C. results. The significant temperature increase at the cold end occurs largely due to the internal temperature equalization in the heat exchanger and only to a smaller extent due to external heat input.

As mentioned several times, in the case shown, severe thermal stresses may occur if the warm end of the heat exchanger is without further measures again subjected to a warm fluid of approximately 20° C. in the example shown after some time of regeneration. However, thermal stresses may also correspondingly occur if a system downstream of the heat exchanger immediately delivers cryogenic fluids again, for example cryogenic fluids from a rectification column system of an air separation system. According to one embodiment, the present invention also addresses the latter problem.

Figure 3:
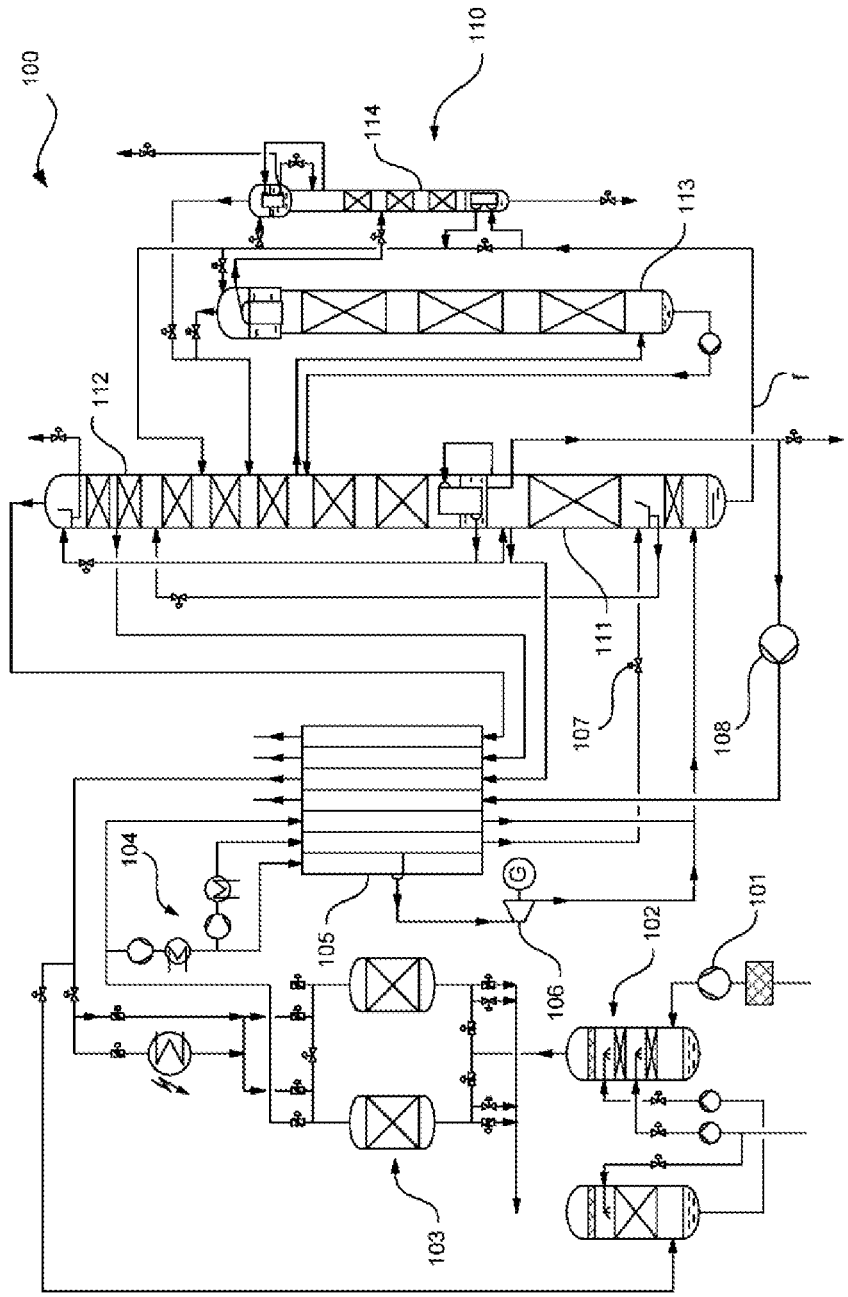
FIG. 3 illustrates an air separation system which may be equipped with an arrangement according to an embodiment of the invention.

FIG. 3 illustrates an arrangement with a heat exchanger according to a particularly preferred embodiment of the present invention and is designated as a whole by 10. The heat exchanger is provided with reference sign 1. It has a first region 2 and a second region 3, which are each illustrated here delimited by dotted lines but in reality are not structurally distinguished from the rest of the heat exchanger 1. The first region 2 and the second region 3 are characterized in particular by the feed or extraction of fluid flows. In the example shown, two fluid flows A and B are conducted through the heat exchanger 1, fluid flow A being previously referred to as the first fluid flow, and fluid flow B being previously referred to as a second fluid flow. The first fluid flow A is cooled in the heat exchanger 1, whereas the second fluid flow B is heated. For further details, reference is made to the explanations above. It should be emphasized in particular that, in the second operating mode explained several times, the corresponding fluid flows A and B do not flow through the heat exchanger, or do not flow through it to the same extent as in the first operating mode. For example, in the second operating mode, fluid flows other than fluid flows A and B can be used or fluid flows A and B can be used in smaller quantities.

The heat exchanger 1 is accommodated in the arrangement 10 in a cold box 4 which is partially filled with an insulating material, for example perlite, which is arranged up to a fill level 6 in the cold box 4 and is illustrated here by crosshatching. A region free of the insulating material, which simultaneously represents a gas chamber surrounding the first region 2 of the heat exchanger 1, is indicated by 5.

In the arrangement 10, a heating device 7 is provided which heats the first region 2 of the heat exchanger 1 during certain time periods of the second operating mode, during the entire second operating mode or, as mentioned, in separate time periods in a third operating mode. For this purpose, heat, illustrated here in the form of a wavy arrow 8, can be transferred by means of the heating device 7 in the arrangement 10 to the first end 2 or the first region 2 of the heat exchanger 1. In the first operating mode, no corresponding heat transfer typically takes place. In the example shown, the second region 3 of the heat exchanger remains uncooled or no heat is actively dissipated therefrom. In embodiments of the invention, however, such a heat dissipation is also possible, for example by a cryogenic fluid, for example a boil-off gas from a downstream system, for example an air separation system, flowing through the second region 3.

FIG. 3 illustrates an air separation system having an arrangement with a heat exchanger which can be operated using a method according to an advantageous embodiment of the present invention.

As mentioned, air separation systems of the type shown are often described elsewhere, for example in H.-W. Haring (ed.), Industrial Gases Processing, Wiley-VCH, 2006, in particular section 2.2.5, "Cryogenic Rectification." For detailed explanations regarding structure and operating principle, reference is therefore made to corresponding technical literature. An air separation system for use of the present invention can be designed in a wide variety of ways. The use of the present invention is not limited to the embodiment according to FIG. 6.

The air separation system shown in FIG. 3 is designated as a whole with 100. It has, inter alia, a main air compressor 101, a pre-cooling device 102, a cleaning system 103, a secondary compressor arrangement 104, a main heat exchanger 105, which can be the heat exchanger 1 as explained above and is in particular part of a corresponding arrangement 10, an expansion turbine 106, a throttle device 107, a pump 108, and a distillation column system 110. In the example shown, the distillation column system 110 comprises a traditional double-column arrangement consisting of a high-pressure column 111 and a low-pressure column 112 as well as a crude argon column 113 and a pure argon column 114.

In the air separation system 100, an input air flow is sucked in and compressed by means of the main air compressor 101 via a filter (not labeled). The compressed input air flow is supplied to the pre-cooling device 102 operated with cooling water. The pre-cooled input air flow is cleaned in the cleaning system 103. In the cleaning system 103, which typically comprises a pair of adsorber containers used in alternating operation, the pre-cooled input air flow is largely freed of water and carbon dioxide.

Downstream of the cleaning system 103, the input air flow is divided into two subflows. One of the subflows is completely cooled in the main heat exchanger 105 at the pressure level of the input air flow. The other subflow is recompressed in the secondary compressor arrangement 104 and likewise cooled in the main heat exchanger 105, but only to an intermediate temperature. After cooling to the intermediate temperature, this so-called turbine flow is expanded by means of the expansion turbine 106 to the pressure level of the completely cooled subflow, combined with it, and fed into the high-pressure column 111.

An oxygen-enriched liquid bottom fraction and a nitrogen-enriched gaseous top fraction are formed in the high-pressure column 111. The oxygen-enriched liquid bottom fraction is withdrawn from the high-pressure column 111, partially used as heating medium in a bottom evaporator of the pure argon column 114, and fed in each case in defined proportions into a top condenser of the pure argon column 114, a top condenser of the crude argon column 113, and the low-pressure column 112. Fluid evaporating in the evaporation chambers of the top condensers of the crude argon column 113 and the pure argon column 114 is also transferred into the low-pressure column 112.

The gaseous nitrogen-rich top product g is withdrawn from the top of the high-pressure column 111, liquefied in a main condenser which produces a heat-exchanging connection between the high-pressure column 111 and the low-pressure column 112, and, in proportions, is applied as a reflux to the high-pressure column 111 and expanded into the low-pressure column 112.

An oxygen-rich liquid bottom fraction and a nitrogen-rich gaseous top fraction are formed in the low-pressure column 112. The former is partially brought to pressure in liquid form in the pump 108, heated in the main heat exchanger 105, and provided as a product. A liquid nitrogen-rich flow is withdrawn from a liquid retaining device at the top of the low-pressure column 112 and discharged from the air separation system 100 as a liquid nitrogen product. A gaseous nitrogen-rich flow withdrawn from the top of the low-pressure column 112 is conducted through the main heat exchanger 105 and provided as a nitrogen product at the pressure of the low-pressure column 112. Furthermore, a flow is withdrawn from an upper region of the low-pressure column 112 and, after heating in the main heat exchanger 105, is used as so-called impure nitrogen in the pre-cooling device 102 or, after heating by means of an electric heater, is used in the cleaning system 103.

Figure 4:
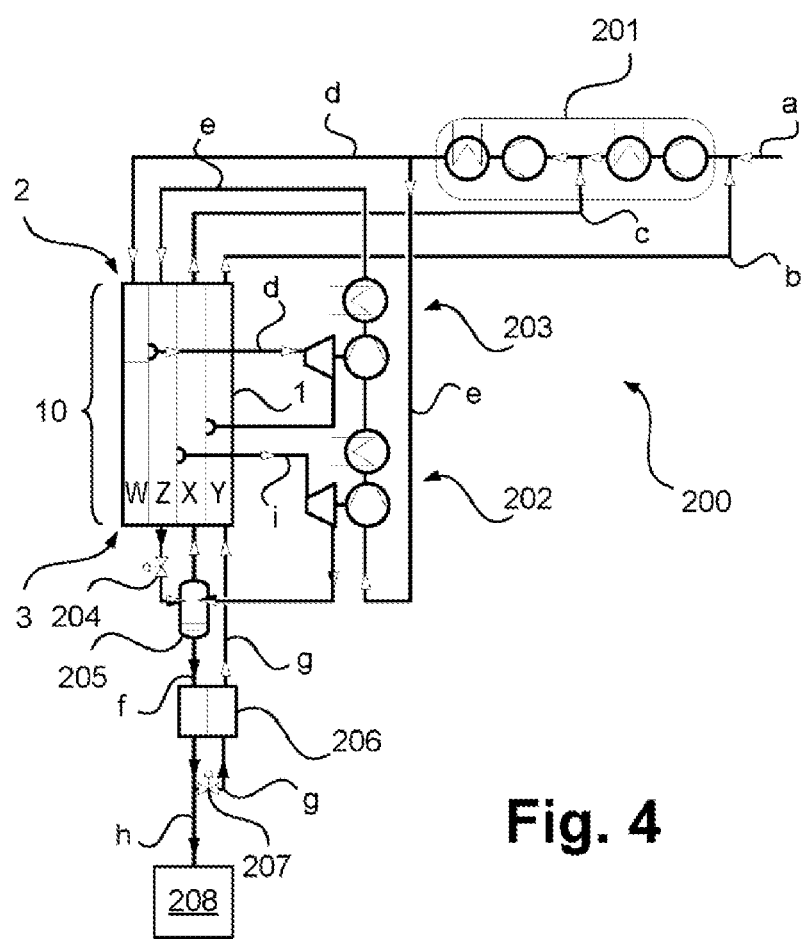
FIG. 4 illustrates a gas liquefaction system which may be equipped with an arrangement according to an embodiment of the invention.

FIG. 4 schematically illustrates an air liquefaction system 200 having an arrangement 10 which has a heat exchanger 1. A corresponding system is also referred to as a "nitrogen liquefier." For further details regarding the arrangement 10, reference is made in particular to the previously explained FIG. 2. The air liquefaction system 200 is used, for example, to provide liquid nitrogen or to liquefy gaseous nitrogen. In order to provide the gaseous nitrogen, an air separation system, as illustrated above, can, for example, be provided.

As explained several times above, the present invention is also suitable for use in connection with systems for liquefying gaseous air products to which a further rectification system is not attached and which therefore, as needed, can be simplified and more frequently put out of operation, and in which, after being put back into operation, cold fluid which is applied to the cold end of the heat exchanger 1 is not yet available.

The heat exchanger 1 is also illustrated here with the first region 2 and the second region 3. However, these regions are only indicated here. As explained in detail below, in a first operating mode, a plurality of first fluids to be cooled is supplied to the heat exchanger 1 in the first region 2 at a first temperature level and conducted through the heat exchanger 1, and in the first operating mode, a plurality of second fluids to be heated is supplied in the second region 3 at a second temperature level below the first temperature level to the heat exchanger 1 and conducted through the heat exchanger 1. The first fluids are cooled, and the second fluids are heated in the process.

Here, the heat exchanger 1 has a number of heat exchanger passages denoted by W to Z. In the first operating mode which is illustrated in FIG. 3 and which corresponds to a normal operation of the liquefaction system 200, i.e., to a production operation, a gaseous nitrogen flow a together with a nitrogen flow b is compressed to a liquefaction pressure level in a multi-stage compressor arrangement 201 to which a further nitrogen flow c is fed in an intermediate stage. The correspondingly compressed nitrogen is divided into two subflows d and e, of which subflow d is supplied to the heat exchanger 1 or its first region 2. Subflow e is further compressed in two turbine boosters 202 and 203 and subsequently likewise supplied to the heat exchanger 1 or its first region 2.

Liquefied nitrogen, which is a portion of subflow e, is extracted from the heat exchanger 1 in the second region 3. This liquefied nitrogen is flashed into a container 205 via a valve 204. Liquid nitrogen withdrawn from the bottom of the container 205 can be supplied in the form of a liquid nitrogen flow f to the warm end of a supercooler 206, which is cooled using a subflow g of the liquid nitrogen flow f, the quantity of which is set via a valve 207. After evaporation in the supercooler 206, subflow g is further heated in the heat exchanger 1 and returned for compression in the form of the aforementioned nitrogen flow b. The remainder of the liquid nitrogen flow f, illustrated here in the form of a liquid nitrogen flow h, can be discharged as a product or stored in a tank 208, for example.

The turbine boosters 202 and 203 are driven using subflow d and a further subflow of subflow e, which is denoted here by i. The subflows d and i are in each case extracted from the heat exchanger 1 at suitable intermediate temperatures. The correspondingly expanded subflow d is supplied to the heat exchanger 1 at an intermediate temperature, combined in the heat exchanger 1 with nitrogen, which is withdrawn in gaseous form from the top of the container 206 and supplied to the heat exchanger 1 at the cold end, heated and returned in the form of the aforementioned nitrogen flow c for compression. The subflow i is fed into the container 205 after a corresponding expansion.

Figure 2:
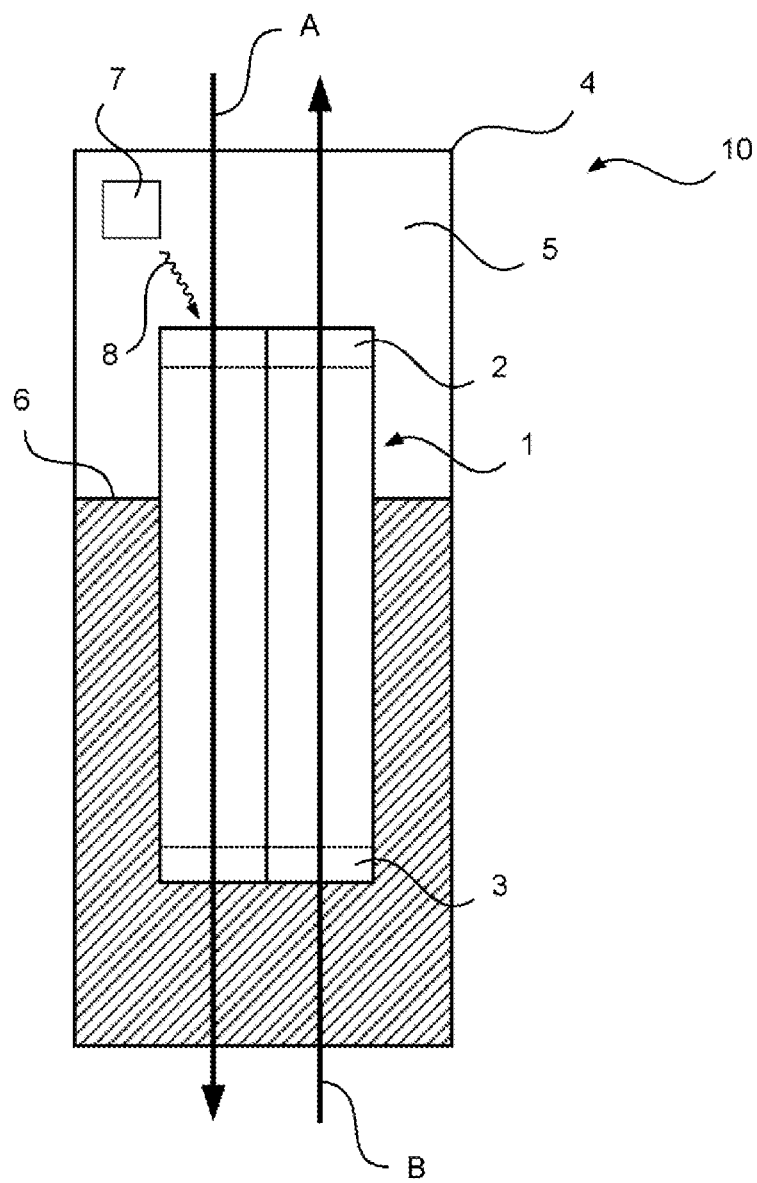
FIG. 2 illustrates an arrangement with a heat exchanger according to a particularly preferred embodiment of the invention.

It is self-evident that, in a second operating mode, in which the feeding of the aforementioned fluid flows into the heat exchanger 1 is halted, a temperature equalization explained with reference to FIG. 1 starts. The measures explained with reference to FIG. 2 are therefore taken. Since no cold-buffering rectification column system is provided on the cold side of the heat exchanger 1 in this case, the second region 3 is not directly loaded with cold fluid when the heat exchanger is put back into operation, but can be cooled gradually by the expansion in the valves 204 and 207. Heating at the warm end is therefore sufficient.

The invention claimed is:

1. A method for operating a heat exchanger, in which
a first operating mode is carried out in first time periods, and a second operating mode is carried out in second time periods that alternate with the first time periods,
in the first operating mode, a first fluid flow is formed at a first temperature level, is fed into the heat exchanger in a first region at the first temperature level, and is partially or completely cooled in the heat exchanger,
in the first operating mode, a second fluid flow is formed at a second temperature level, is fed into the heat exchanger in a second region at the second temperature level, and is partially or completely heated in the heat exchanger,
in the second operating mode, the feeding of the first fluid flow and of the second fluid flow into the heat exchanger is partially or completely halted, and
either in the second time period, or in a third time period which lies between at least one of the second time periods and the subsequent first time period, heat is supplied to the first region, the heat being provided by means of a heating device arranged outside the heat exchanger,
wherein
the heat provided by means of the heating device is transferred to the first region via a gas chamber which is located outside the heat exchanger and in which the first region is arranged.

2. The method according to claim 1, in which the heat is transferred to the first region at least partially by convection and/or radiation via the gas chamber.

3. The method according to claim 1, in which the second region is operated without being cooled, while heat is supplied to the first region in the second time period or in the third time period.

4. The method according to claim 3, in which the heat exchanger is operated within the scope of a gas liquefaction method.

5. The method according to claim 4, in which the gas liquefaction method comprises at least partially liquefying the first fluid flow and providing it as a method product in an unchanged material composition.

6. The method according to claim 1, in which the second region is at least temporarily cooled, while heat is supplied to the first region in the second time period or in the third time period.

7. The method according to claim 6, in which the heat exchanger is operated within the scope of a gas mixture separation method.

8. The method according to claim 7, in which the gas mixture separation method is carried out with an integrated gas liquefaction method.

9. The method according to claim 7, in which a cryogenic liquid formed in the gas mixture separation method or an externally provided cryogenic liquid is evaporated, and an evaporated portion of the liquid is at least partially used to cool the second region.

10. An arrangement having a heat exchanger, wherein the arrangement has means configured
to carry out a first operating mode in first time periods and to carry out a second operating mode in second time periods that alternate with the first time periods,
in the first operating mode, to form a first fluid flow at a first temperature level, to feed it into the heat exchanger in a first region at the first temperature level, and to cool it partially or completely in the heat exchanger,
in the first operating mode, to form a second fluid flow at a second temperature level, to feed it into the heat exchanger in a second region at the second temperature level, and to heat it partially or completely in the heat exchanger,
in the second operating mode, to halt the feeding of the first fluid flow and of the second fluid flow into the heat exchanger partially or completely, and
the arrangement comprises a heating device which is arranged outside the heat exchanger and is configured to supply heat, which is provided by means of the heating device, to the first region either in the second time period or in a third time period which lies between at least one of the second time periods and the subsequent first time period,
wherein
the arrangement comprises a gas chamber which is arranged outside the heat exchanger and in which the first region is arranged, and the arrangement is configured to transfer the heat provided by means of the heating device to the second region via the gas chamber.

11. The arrangement according to claim 10, comprising a cold box in which the heat exchanger is arranged, wherein the gas chamber is formed by a region free of insulating material within the cold box.

12. The arrangement according to claim 10, in which the first region of the heat exchanger is arranged in the gas chamber within the cold box without suspensions contacting the first region.

13. The arrangement according to claim 10, in which the heating device is designed as a radiant heater, or in which the heating device has heating bands or heating coils.

14. A system having an arrangement according to claim 10, wherein the system is designed as a gas liquefaction system and/or a gas mixture separation system.

15. The system according to claim 14, wherein the system is configured to carry out a method for operating a heat exchanger, in which a first operating mode is carried out in first time periods, and a second operating mode is carried out in second time periods that alternate with the first time periods, in the first operating mode, a first fluid flow is formed at a first temperature level, is fed into the heat exchanger in a first region at the first temperature level, and is partially or completely cooled in the heat exchanger, in the first operating mode, a second fluid flow is formed at a second temperature level, is fed into the heat exchanger in a second region at the second temperature level, and is partially or completely heated in the heat exchanger, in the second operating mode, the feeding of the first fluid flow and of the second fluid flow into the heat exchanger is partially or completely halted, and either in the second time period, or in a third time period which lies between at least one of the second time periods and the subsequent first time period, heat is supplied to the first region, the heat being provided by means of a heating device arranged outside the heat exchanger, wherein the heat provided by means of the heating device is transferred to the first region via a gas chamber which is located outside the heat exchanger and in which the first region is arranged.

* * * * *